June 19, 1962  H. C. MOLENAAR  3,039,127
WINDSHIELD WASHERS
Filed May 6, 1960  3 Sheets-Sheet 1
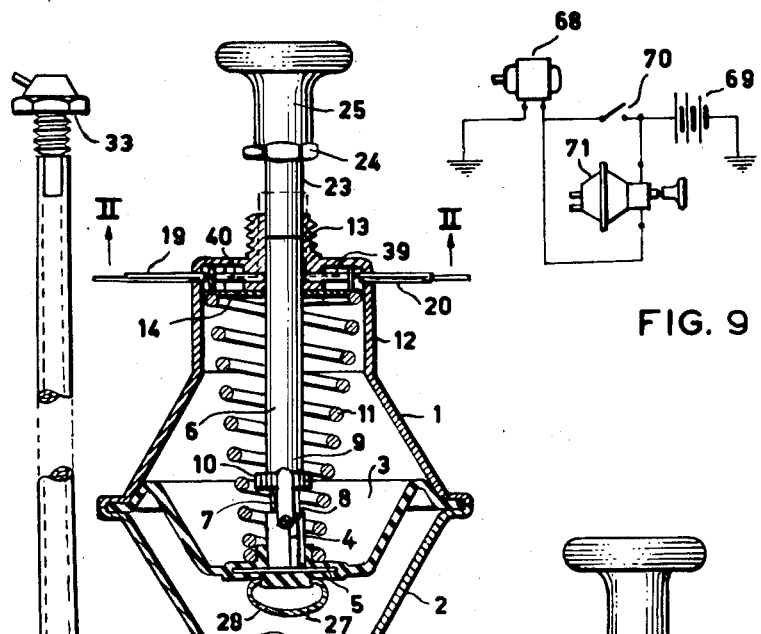
FIG. 9
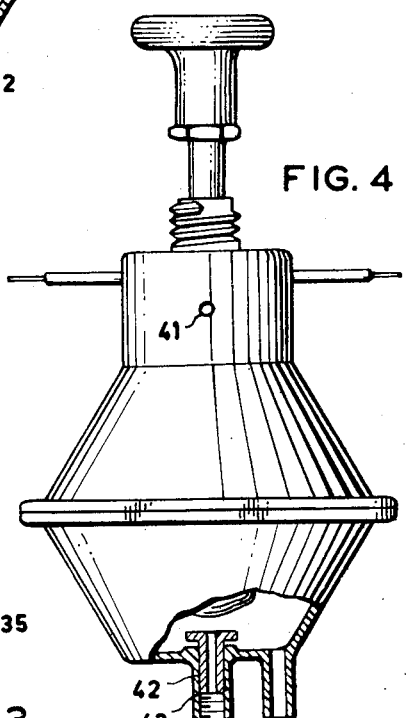
FIG. 4
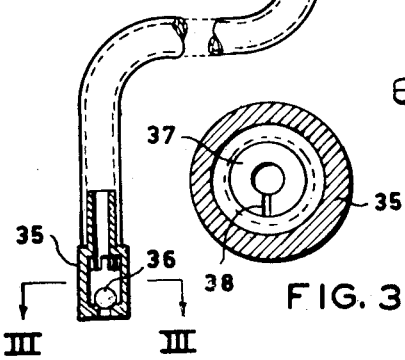
FIG. 3
FIG. 1
INVENTOR.
HENRI C. MOLENAAR
BY
HIS ATTORNEYS June 19, 1962  H. C. MOLENAAR  3,039,127
WINDSHIELD WASHERS
Filed May 6, 1960  3 Sheets-Sheet 2
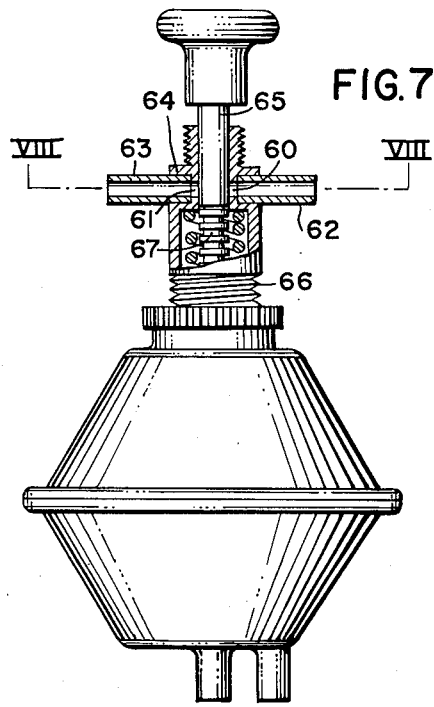
INVENTOR
HENRI C. MOLENAAR
BY
his ATTORNEYS June 19, 1962 H. C. MOLENAAR 3,039,127
WINDSHIELD WASHERS Filed May 6, 1960 3 Sheets-Sheet 3

INVENTOR.
HENRI C. MOLENAAR
BY
HIS ATTORNEYS

United States Patent Office 3,039,127
Patented June 19, 1962

1

3,039,127
WINDSHIELD WASHERS
Henri C. Molenaar, Stevinstraat 177,
The Hague, Netherlands
Filed May 6, 1960, Ser. No. 27,304
8 Claims. (Cl. 15—250.02)

This invention relates to windshield washing units for automobiles, and particularly to systems including a pump for spraying or squirting a washing fluid onto the windshield of a vehicle and a control for the windshield wiper or wipers which automatically sets the wiper or wipers into motion when the pump is operated and continues its operation for a selected period of time after the fluid has been squirted on the windshield to enable the windshield to be thoroughly cleaned.

It is an object of the present invention to provide a pump unit in which the period of time during which the windshield wiper motor operates after discharge of liquid from the pump chamber is adjustable.

Another object of the invention is to provide a pump unit which is arranged to act as a control for supplying electric current to an electric motor for driving a windshield wiper when the pump is actuated and to maintain the supply of current during delivery of liquid to the windshield and during a predetermined variable period of time after delivery of liquid to the windshield has ceased.

A further object of the invention is to provide a pump unit serving as a control for connecting a vacuum-creating unit to a vacuum-type windshield wiper motor to maintain the motor in operation during delivery of liquid to the windshield and during a variable and adjustable period of time after delivery of liquid to the windshield has ceased.

Still another object of the invention is to provide a pump unit which is capable of interrupting one circuit and making a second circuit in quick sequence after discharge of liquid from the pump has ceased.

A further object of the invention is to provide a pump unit capable of connecting a windshield wiper motor with a source of power without actuating the pump to spray a cleaning liquid on the windshield.

The above and other objects of the invention are obtained in accordance with the present invention by providing a pumping unit which includes a pumping member having a stem thereon and connecting elements by means of which power is supplied to the windshield wiper motor and in which the position of the stem determines whether a connection is made or broken between the control elements whereby upon relative adjustment of the stem and the control elements, the period of operation of the windshield wiper following discharge of liquid by the pump can be adjusted.

More particularly, in accordance with the present invention, the control unit may include electrical contacts mounted on the casing of the pump unit and a stem having an insulating portion and a conducting portion thereon which serve to interrupt a circuit through the contacts and complete a circuit through the contacts, respectively, depending upon the position of the stem with respect to the contacts. By variably adjusting the position of the contacts or the position of the stem or the insulating portion thereof, the period of operation of the windshield wiper motor may be adjusted.

In a similar way, the operation of the vacuum type

2 windshield wiper may also be controlled by adjusting the position of the stem relative to flow passages in the pump casing whereby a longer or shorter period of operation of the windshield wiper following discharge of the liquid therefrom is obtained.

In accordance with the further embodiment of the invention, a switch which is operated by movement of the stem of the pump is provided to make or break two independent circuits therethrough and in which the means for operating the circuit is adjustable to cause the circuit to be changed at different times during the movement of the pump stem.

For a better understanding of the present invention, reference may be had to the accompanying drawing in which:

FIGURE 1 is a view in longitudinal section and partially broken away of a windshield wiper and control system embodying the invention in which the pumping member is shown as occupying an intermediate position of its operating movement;

FIGURE 2 is a view in cross section taken on line II—II of FIGURE 1;

FIGURE 3 is a view in cross section slightly enlarged, taken on line III—III of FIGURE 1 with the ball check removed;

FIGURE 4 is an elevational view of a modified form of pump and control unit embodying the invention with portions broken away;

FIGURE 5 is a view in longitudinal section of another form of the invention;

FIGURE 6 is an elevational and partially broken away view of still another embodiment of the invention;

FIGURE 7 is an elevational and partially broken away view of another form of the invention including a control for a pneumatically-operated windshield wiper motor;

FIGURE 8 is a view in cross section taken along line VIII—VIII of FIGURE 7;

FIGURE 9 is a schematic diagram of the electrical connections for the windshield washer shown in FIGURES 1, 4, 5 and 6;

Figure 10:
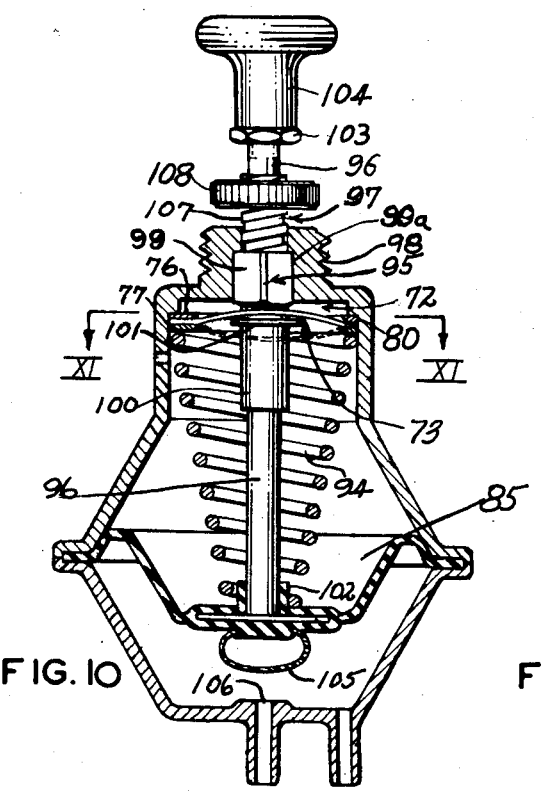
FIGURE 10 is a view in longitudinal section of still another form of the invention.

All of the embodiments of the pump and control unit described hereinafter are connected in a secondary circuit between a windshield wiper motor and a battery of an automobile so that the windshield wiper can be controlled independently of the windshield washer unit or by operation of the windshield washer unit or units described hereinafter.

The form of the invention disclosed in FIGURES 1 to 3, includes upper and lower hollow pump casing sections 1 and 2 having a diaphragm 3 formed of a resilient material, such as rubber, clamped around its edge between the opposing edges of the facing sections. In order to simplify the structure and, in particular, the electrical connections described hereinafter, the casing sections 1 and 2 may be formed of an insulating material, such as a synthetic resin, plastic or the like.

While it is possible to arrange the pumping units described hereinafter so that the diaphragm 3 is moved to exert a suction stroke by means of a vacuum developed in the space between the casing section 1 and the diaphragm, all of the units described hereinafter are arranged so that the diaphragm is moved manually to draw liquid into the pump.

The diaphragm 3 is secured to a section 4 of an actuating stem by means of a disc 5 rigidly secured to the stem and confined as, for example, by means of molding in the central part of the diaphragm 3. The stem section 4 is connected with a second stem section 6 axially in alignment therewith by means of a screw 7 forming a part of an adjustable connection 8. The position of the stem section 6 relative to the section 4 is determined by means of the screw 7 which can be retained in adjusted position by means of a leaf spring 9 which is secured to the section 4 and engages a disc 10 provided with a notched rim secured to the stem section 6. In this way, when the stem section 6 is rotated, it is moved toward or away from the stem section 4.

The stem and diaphragm 3 are normally urged inwardly by means of a compression spring 11 mounted within a spring chamber 12 forming an extension of the casing section 1. A bearing 13 at the outer end of the spring housing 12 receives the stem section 6 slidably. The stem sections 4 and 6 and the diaphragm 3 are biased inwardly in the direction of a discharge stroke by means of the spring 11 which bears at its inner end against the diaphragm and at its outer end against a washer 14 of insulating material within the outer end of the spring chamber 12. The wall of the spring chamber 12 and a part of the bearing 13 are provided with a pair of aligned radial bores 15, 16, 17 and 18 (FIGURE 2). The bores 16 and 18 receive the leads or conductors 19 and 20 of the secondary control circuit by means of which electrical current is supplied from a battery or other electrical source to the windshield wiper motor. Connected with the terminals 19 and 20 are the pin-shaped contact or brush members 39 and 40 which are biased inwardly against the stem by means of the springs 21 and 22 housed in an annular space between the wall of the spring chamber 12 and the bearing 13. The annular space is divided into two sections by means of the ribs 26, as best shown in FIGURE 2.

At the upper end of the stem portion 6 is a sleeve 23 formed of insulating material which is retained in engagement with the stem portion by means of a nut 24 threaded on the upper end of the stem section 6 and further retained thereon by means of a manual operating knob 25 also threaded on the upper end of the stem. When the stem 6 below the sleeve 23 engages the brushes 39 and 40, it will be clear that a circuit is completed between the leaders or conductors 19 or 20. On the other hand, when the insulating sleeve 23 comes between the brushes 39 and 40, the circuit through the windshield wiper motor is interrupted and the motor stops. By adjusting the spacing between the stem sections 4 and 6, the period of operation of the windshield wiper motor can be prolonged or shortened due to the fact that the insulating sleeve is adjusted closer to or farther away from the contacts and thus, enables a longer or shorter portion of the stroke of the stem to take place before the circuit is interrupted.

The side of the diaphragm 3 facing the pump casing section 2 carries a resilient stopper member 27 which has the shape, generally, of a segment of a sphere and moves with the diaphragm. When the diaphragm 3 is in its innermost position, the stopper member 27 which contains a hole 28 therein engages and covers the outlet opening 29 in the pump chamber to prevent discharge of liquid therethrough. However, the diaphragm can continue to move inwardly with the stem to complete the discharge stroke of the pump for the reason that a means is provided enabling a restricted flow of liquid from the pump chamber as described hereinafter.

Inasmuch as the stopper member 27 is provided with the opening 28, the static pressure in the space within the stopper member will always be equal to the static pressure in the pump chamber.

As illustrated in FIGURE 1, the discharge outlet 29 communicates with a tubular extension 30 on which is received a hose 32 carrying a discharge nozzle or jet 33 which is adapted to be mounted in the vehicle in a position to direct the liquid against the outside of its windshield.

The casing section 2 also is provided with an inlet tube 31 which receives a hose 34 carrying at its lower lower end a check valve unit including a casing 35 and a ball check 36 therein. As shown in FIGURE 3, the seat 37 for the ball 36 is provided with a small groove 38 which serves to permit slow leakage of the liquid from the pump chamber during the final movement of the diaphragm 3 to the end of its pumping stroke.

A similar control over the operation of the windshield wiper can be accomplished by adjusting the position of the outlet opening of the pump to vary the time at which the stopper member on the diaphragm closes the outlet, as illustrated in FIGURE 4 of the drawing. To that end, the discharge outlet may be provided with a tubular, externally-threaded sleeve member 42 which is in threaded engagement with internal threads in the discharge outlet. A slot 43 is formed in the end of the sleeve enabling it to be adjusted by means of a screwdriver inserted through the outer end of the outlet when the discharge hose is connected therefrom. In this form of the invention as in the form of the invention disclosed in FIGURE 1 and the forms described hereinafter, a ventilating hole 41 may be formed in the upper casing section or spring chamber, as shown in FIGURE 4.

It will be noted that in the forms of the invention disclosed in FIGURES 1 to 4, the bearing 13 extends beyond the spring chamber and is threaded so that it can be inserted through a hole in the instrument panel of the vehicle and secured thereto by means of a nut.

FIGURE 5 shows another variation of the pump and control unit. It differs from the pump unit shown in FIGURE 1 in that the adjustability of the insulating sleeve on the stem is obtained in a different manner. As shown in FIGURE 5, the diaphragm-actuating stem 44 carries slidably a sleeve 45 of conducting material which is normally biased outwardly along the stem 44 by means of a spring 46.

An insulating sleeve 48 is screwed onto the threaded upper end of the stem 44 and is adjustable lengthwise of the stem by rotating it by means of a flange or knob 49 at its upper end. The insulating sleeve 48 may further be secured in position by an operating knob which is screwed on the upper end of the stem. The sleeve 48 can be adjusted lengthwise of the stem 44 by rotating the sleeve to vary the spacing between the pumping diaphragm and the insulating sleeve 48 thereby enabling the period of operation of the windshield wiper motor to be varied after discharge of liquid is discontinued.

FIGURE 6 shows a further modification of the invention in which the spacing between an insulating portion on the stem and the contacts on the pump casing can be varied to control the duration of operation of the windshield wiper motor. In this form of the invention, an internally-threaded section 50 is formed on the pump casing and receives the spring housing 51 for adjustment axially thereof. A lock nut 52 is provided for locking the spring housing in position. The upper end of a compression spring 53 bears against the upper inner end of the spring housing 51 and serves to produce the pumping or discharge stroke. In the upper end of the spring housing 51 also are mounted slidably a brush 54 having a flange 55 at its outer end and a diametrically-spaced brush 56 having a flange 57 at its outer end.

A rubber band 58 extends around the outside of the spring housing and bears against the flanges 55 and 57 to urge the brushes inwardly against a sleeve 59 on the operating stem or against the stem proper. The sleeve 59 is formed of insulating material, while the stem 59a is formed of conductive material as described above. With this arrangement, it will be apparent that by adjusting the spring housing 51 inwardly and outwardly and thereby adjusting the brushes 54 and 56 axially of the stem, a greater or lesser period of operation of the windshield wiper motor following the discharge of liquid is obtained.

Windshield washers of the types described above can be connected in the electrical system of a vehicle as shown in FIGURE 9. In this FIGURE, the windshield wiper motor is 68 and has one terminal grounded and the other terminal connected to a terminal of battery 69 by means of an "on-off" switch 70. The windshield washer identified as 71 and corresponding to those disclosed in FIGURES 1 to 6, is connected in parallel with the switch 70 so that the windshield wiper can be operated by the switch 70 or the washer 71.

The form of the invention disclosed in FIGURES 7 and 8 is similar to that shown in FIGURE 6 with the exception that it is constructed to make and break a connection between a vacuum source and a vacuum-actuated windshield wiper motor, or between a source of gas pressure and a gas pressure-operated windshield wiper motor. To that end, a pair of chambers 60 and 61 communicating with tubular couplings 62 and 63 are formed in the adjustable spring housing 64 which receives slidably the operating stem 65 of the unit. The spring housing is adjustable axially by means of the threads 66 thereon to vary the operation of the windshield wiper.

The upper end of the stem 65 is of solid, rod-like form, while the lower portion of the stem corresponding to the conductive portion 59a shown in FIGURE 6 is provided with grooves or slots 67 permitting gas to flow through the chambers 60, 61 and the couplings 62, 63 when any of the grooves 67 is disposed between them. On the other hand, when the solid portion 65 of the stem is interposed between the chambers 60 and 61, flow of gas is shut off and the operation of the windshield wiper motor is stopped.

Figure 11:
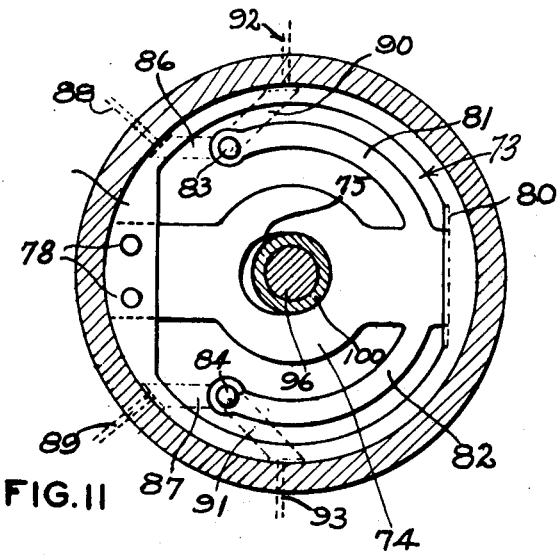
FIGURE 11 is a view in cross section and on a larger scale taken on line XI—XI of FIGURE 10.

The pump unit shown in FIGURES 10 and 11 is used with a windshield wiper motor requiring, in quick sequence, the opening of one circuit and the closing of another circuit. With reference to FIGURE 10, the upper conical section of the pump casing merges with a cylindrical spring chamber which houses a snap-action switch 72 including a tensioned leaf spring 73, which spring is stable in two extreme positions. As shown in FIGURE 11, the leaf spring 73 is provided with a widened central portion 74 containing an oblong opening 75. One end of spring 73 is secured between two identical rings 76 and 77 by means of two rivets 78, whereas the other end 79 of the blade spring 73 is supported in a V-shaped groove 80 formed by the rings 76 and 77. Since the length of spring 73 between rivets 78 and groove 80 is slightly greater than the distance between said rivets 78 and the groove 80, the spring 73 can assume two stable inner and outer limit positions, which positions are shown in FIGURE 10 in full and dotted lines.

Two curved resilient arms 81 and 82 are integral with the spring 73 and extend generally in the plane thereof. At the free ends, the arms 81 and 82 are provided with contacts 83 and 84, respectively. When the spring 73 is in the position shown in dotted lines in FIGURE 10, which position corresponds with the position of the pumping diaphragm 85 when it occupies the end position of its discharge stroke, the contacts 83 and 84 are resiliently pressed against terminals 86 and 87, respectively, mounted within the spring chamber and connected with leads or conductors 88 and 89, respectively. When the spring 73 assumes the position shown in full lines in FIGURE 10, the contacts 83 and 84 are urged resiliently against two other contacts 90 and 91 mounted within the spring chamber 12 and connected with leads or conductors 92 and 93, respectively. Thus, in one limit position of the spring 73, leads 88 and 89 are interconnected and the connection between leads 92 and 93 interrupted, and in the other limit position of the spring 73, leads 92 and 93 are interconnected and the connection between leads 88 and 89 is interrupted. Inasmuch as arms 81 and 82 are resilient, they will remain in position until spring 73 snaps from one limit position to the other limit position so that the connection between the leads 88 and 89 is abruptly cut off and substantially simultaneously the leads 92 and 93 are connected, or vice-versa.

Rings 76 and 77 between which spring 73 is secured are confined in the spring chamber between the end of the diaphragm-actuating spring 94 and an internal surface of the spring chamber.

A sleeve 95 for moving spring 73 away from one of its limit positions to its other limit position and vice-versa, is slidable on the pump-actuating stem 96. The sleeve 95 includes a tubular portion 97 which is slidably received in a bearing 98 at the upper end of the spring chamber.

Between the tubular portion 97 and the spring 73, sleeve 95 has a portion 99 of a square or other non-circular cross section which is slidable in a recess 99a of generally complemental cross-section. Below the square portion 99, sleeve 95 has a cylindrical extension 100 with an external diameter which is smaller than the width of the oblong opening 75 of spring 73. Thus, spring 73 is confined with the necessary play in axial direction between the square portion 99 of sleeve 95 and a flange 101 secured on the cylindrical extension 100.

When the stem 96 is pulled out and the pumping diaphragm 85 approaches the end of its suction stroke, the cylindrical extension 100 of the sleeve 95 is engaged by a collar 102 on the pumping diaphragm 85. When the pumping diaphragm, under the influence of spring 94, approaches the end of its discharge stroke, the sleeve 95 is displaced in an inward direction by means of a nut 103 on the stem 96.

Figure 12:
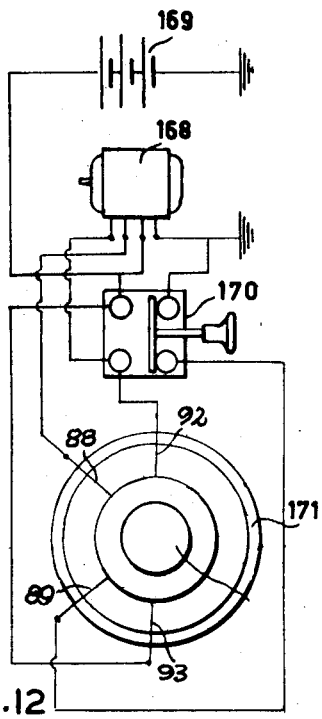
FIGURE 12 is a schematic wiring diagram for the windshield washer shown in FIGURE 10.

The operation of the pump is as follows:

On pulling out the stem 96 by means of the knob 104, the shoulder 102 engages the end of the cylindrical extension 100 of sleeve 95 bending the spring 73 and causing it to move to its limit position shown in full lines in FIGURE 10, so that the windshield wiper motor 168 (FIGURE 12) is put in operation. Inasmuch as stem 96 can slide in sleeve 95, this situation is maintained during the discharge stroke of the pumping diaphragm 85 as the pump delivers washing liquid to the windshield and also when stopper member 105 has covered outlet opening 106 of the pump chamber. Because the pump is arranged so that a restricted escape of liquid occurs after the discharge opening is closed, as described above (see FIGURE 3), the stem 96 under the influence of spring 94 can slowly complete its discharge stroke as described above. During the completion of the discharge stroke, the lock nut 103 engages the end of tubular portion 97 of sleeve 95 and displaces it and the spring 73 slowly from the position shown in full lines in FIGURE 10 towards the position shown in dotted lines. During such displacement, contacts 83 and 84 remain in contact with contacts 90 and 91, respectively, but before the discharge stroke has been fully completed, the spring 73 has been bent to such an extent that it snaps over to its limit, dotted line position. When the spring snaps over, the connection between contacts 90 and 91 is broken and the connection between terminals 86 and 87 is made, whereby a secondary circuit between the windshield wiper motor 168 and the source of power 169 (FIGURE 12) is broken and a circuit for arresting said motor in a parking position of the wiper blades is closed.

As the lock nut 103 and the knob 104 are adjustable axially of the stem 96, the period of time during which the windshield wiper motor is maintained in operation after dscharge of liquid from the pump chamber has commenced can be adjusted by rotating the knob 104.

The pump unit shown in FIGURES 10 and 11 can be interconnected with a dual contact control switch 170 (FIGURE 12) for the windshield wiper motor. In this view, the numeral 171 denotes a washer according to the invention, reference numeral 168 denotes a windshield wiper motor and reference numeral 169 denotes the battery of a vehicle.

The unit can also be modified to include a switch arrangement which takes the place of the switch 170. To that end, tubular portion 97 of sleeve 95 is provided with external threads 107, a nut 108 being screwed on said thread and being engageable with the end of the bearing 98. By rotating nut 108, the sleeve 95 is moved endwise to move the spring 73 from the dotted-line position to the full-line position without actuating the pumping member. During this adjustment, the pumping diaphragm 85 is displaced in the direction of the suction stroke to a small extent by engagement of the end of the sleeve 95 with the nut 103, but the outlet opening 106 remains covered by resilient stopper member 107, whereas the windshield wiper motor is energized. As soon as nut 108 is turned in the opposite direction, the spring 73 is returned to the dotted-line position by means of stem 96, nut 103, spring 94 and sleeve 95. Due to the non-circular shape of sleeve portion 99, rotation of sleeve 95 is prevented when the nut 108 is rotated.

Figure 13:
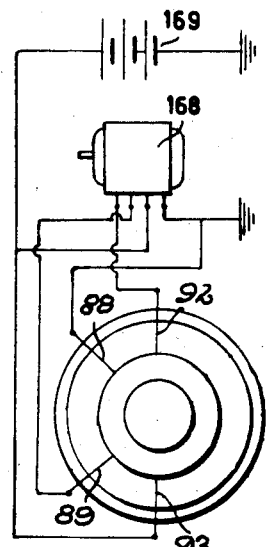
FIGURE 13 is a modified schematic wiring diagram for the windshield washer shown in FIGURE 10.

As shown in FIGURE 13, the combined switch control of the unit shown in FIGURE 10 including the switch control nut 108 and the snap-action switch 72, can be interconnected with the battery 169 and the windshield wiper motor 168 without a conventional switch 170.

It will be understood that the unit is susceptible to other structural modifications to enable the units to be installed in different vehicles and, accordingly, the forms of the invention disclosed herein should be considered as illustrative.

I claim:

1. A windshield washer for cooperation with a windshield wiper having a driving motor, comprising a hollow casing having a pumping chamber therein, a pumping member movable in said casing for drawing liquid into and discharging liquid from said pumping chamber, a pair of electrical contacts on said casing for connecting said driving motor to a source of power, a stem connected to and movable with said pumping member, an electrically-conductive portion on and adjustable axially of said stem for engaging said contacts to connect said motor to said source, an electrically-insulating portion on and adjustable axially of said stem for engaging said contacts to disconnect said motor from said source when the pumping member is near the end of its stroke, and screw-threaded means for adjusting said portions axially of said stem to vary the duration of the period in which the motor is connected to said source after discharge of liquid from said pumping chamber has substantially ceased.

2. A windshield washer for cooperation with a windshield wiper having a driving motor, comprising a hollow casing having a pumping chamber therein, a pumping member movable in said casing for drawing liquid into and discharging liquid from said pumping chamber, a pair of electrical contacts on said casing for connecting said driving motor to a source of power, a stem connected to and movable with said pumping member and having electrically-conductive and electrically-insulating portions, said insulating and conductive portions being separate and fixed to said stem, screw-threaded means for adjusting the length of the stem and the distance between said sections and said pumping member to vary the duration of the period in which the motor is connected to said source after discharge of said liquid from said pumping chamber has substantially ceased.

3. A windshield washer for cooperation with a windshield wiper having a driving motor, comprising a hollow casing having a pumping chamber therein, a pumping member movable in said casing for drawing liquid into and discharging liquid from said pumping chamber, a snap-action switch having two contacts, two pairs of terminals and a blade member movable selectively to one limit position connecting said contacts to one pair of terminals for energizing said driving motor and another limit position connecting said pair of contacts with another pair of terminals for arresting operation of said driving motor in wiper-parking position, a stem attached to said pumping member, means responsive to movement of said stem for moving said switch selectively to its limit positions, and means for adjusting said switch and said means for moving said switch relatively to vary the duration of the period in which said motor is connected to said source after discharge of liquid from said pumping chamber has substantially ceased.

4. A windshield washer for cooperation with a windshield wiper having a driving motor, comprising a hollow casing having a pumping chamber therein, a pumping member movable in said casing for drawing liquid into and discharging liquid from said pumping chamber, a snap-action switch having a pair of contacts, two pairs of terminals and a blade member movable selectively to one limit position connecting said pair of contacts to one pair of terminals to connect said driving motor to said source and another limit position connecting to said pair of contacts to the other pair of terminals for arresting operation of said driving motor in wiper-parking position, a stem attached to said pumping member, a sleeve in said casing slidably receiving said stem and engageable with said blade member to move said contacts selectively to their limit positions as said pumping member approaches the end of its movement for drawing liquid into and discharging liquid from said pumping chamber, and means for adjusting said stem relative to said sleeve for actuating said switch to vary the duration of the period in which the motor is connected to said source after discharge of liquid from said pumping chamber has substantially ceased.

5. The windshield washer set forth in claim 4 comprising manually-operable means connected to said sleeve for adjusting it relative to said stem and said pumping member to move said blade out of engagement with one pair of contacts and into engagement with the other pair of contacts.

6. A windshield washer for cooperation with a windshield wiper having a driving motor, comprising a hollow casing having a pumping chamber therein, a pumping member movable in said casing for drawing liquid into and discharging liquid from said pumping chamber, control means on said casing for connecting said driving motor to a source of power, means connected to and movable with said pumping member for actuating said control means to disconnect said motor from said source when the pumping member is near the end of its stroke, means responsive to movement of said pumping member as it approaches the end of its discharge stroke for restricting discharge of liquid from said pumping chamber, and means for adjusting the control means and said means for actuating said control means relatively to vary the duration of the period in which the motor is connected to said source after discharge of liquid from said pumping chamber has substantially ceased.

7. The windshield washer set forth in claim 6 in which the adjusting means comprises an outlet tube for discharging liquid from said pump casing, means for adjusting said outlet tube toward and away from said pumping member, and said means for restricting discharge of liquid from said pumping chamber comprises a compressible member movable with said pumping member and engageable with said outlet tube to close it.

8. A windshield washer for cooperation with a windshield wiper having a driving motor, comprising a hollow casing having a pumping chamber therein, means forming an inlet and discharge outlet in said pumping chamber, a pumping diaphragm mounted in said casing and movable therein to draw liquid into said chamber through said inlet and discharge it through said outlet, a stem secured to said diaphragm and extending from said casing for moving said diaphragm to draw liquid into said chamber, spring means for moving said diaphragm in the opposite direction to discharge liquid from said outlet, means carried by said diaphragm for covering said outlet as the diaphragm approaches the end of its discharging movement, means for restricting escape of liquid from said pumping chamber after said outlet is covered, control means on said casing and said stem for connecting and disconnecting said driving motor and a source of power, and means for adjusting said control means to vary the duration of the period while the motor and source are connected.

References Cited in the file of this patent

UNITED STATES PATENTS 2,206,814     Horton               July 2, 1940

FOREIGN PATENTS 1,202,331     France               July 20, 1959

UNITED STATES PATENT OFFICE
CERTIFICATE OF CORRECTION

Patent No. 3,039,127 June 19, 1962

Henri C. Molenaar

It is hereby certified that error appears in the above numbered patent requiring correction and that the said Letters Patent should read as corrected below.

Column 4, line 13, strike out "lower"; column 8, line 25 for "to" read -- the --.

Signed and sealed this 2nd day of October 1962.

SEAL)
Attest:

ERNEST W. SWIDER
Attesting Officer

DAVID L. LADD
Commissioner of Patents